United States Patent
Spinella et al.

[11] Patent Number: 5,829,664
[45] Date of Patent: Nov. 3, 1998

[54] RESISTANCE HEATED STIR WELDING

[75] Inventors: Donald J. Spinella, Mt. Pleasant; Eric T. Streicher, New Kensington; Raymond Kastelic, Lower Burrell, all of Pa.

[73] Assignee: Aluminum Company of America, Pittsburgh, Pa.

[21] Appl. No.: 749,716

[22] Filed: Nov. 15, 1996

[51] Int. Cl.$^6$ ................................................ B23K 20/12
[52] U.S. Cl. ...................... 228/112.1; 228/2.1; 219/78.13
[58] Field of Search .................... 228/2.1, 112.1; 219/78.13

[56] References Cited

U.S. PATENT DOCUMENTS

| | | | |
|---|---|---|---|
| Re. 35,116 | 12/1995 | Butler et al. | 137/15 |
| 3,949,896 | 4/1976 | Luc | 220/75 |
| 4,144,110 | 3/1979 | Luc | 156/73.5 |
| 5,460,317 | 10/1995 | Thomas et al. | 228/2.1 |
| 5,469,617 | 11/1995 | Thomas et al. | 29/889.21 |
| 5,486,262 | 1/1996 | Searle | 156/580 |
| 5,492,264 | 2/1996 | Wadleigh | 228/112.1 |
| 5,519,182 | 5/1996 | Linzell | 228/2.1 |

OTHER PUBLICATIONS

DeLangis, L.M., "Manufacturing/Fabrication: Floor–Mounted Tool for Friction Stir Welding", *NASA Tech Briefs*, Sep. 1996.

Midling, O.T., "Material Flow Behaviour and Microstructural Integrity of Friction Stir Butt Weldments", The 4$^{th}$ International Conference of Aluminum Alloys, pp. 451–458, Sep. 1994.

Midling, O.T. et al., "Joining of Aluminium Constructions by Friction Stir Welding", 27$^{th}$ International Symposium on Automotive Technology and Automation, 1994,Aachen, Germany, pp. 423–430.

*Primary Examiner*—Patrick Ryan
*Assistant Examiner*—Jeffrey T. Knapp
*Attorney, Agent, or Firm*—Elroy Strickland; Tracey D. Beiriger

[57] ABSTRACT

A method for welding together two workpieces includes the steps of abutting workpieces together along respective edges of each of the workpieces, and locating one end of a rotatable tool astride the edges and against the workpieces. The tool is provided with a relatively narrow pin extending from the working end of the tool to engage the workpiece edges. The tool and pin are rotated to heat the workpiece edges, and the tool and workpieces are relatively moved. Electric current is supplied between the workpiece edges and the pin, with electrical resistance occurring between the workpiece edges and pin to provide heat in addition to the heat generated by friction occurring between the pin and workpieces to weld the workpieces together.

8 Claims, 1 Drawing Sheet

RESISTANCE HEATED STIR WELDING

BACKGROUND OF THE INVENTION

The present invention relates generally to seam welding abutting workpieces together, and particularly to mechanical "stir" welding in combination with electrical resistance heating of the workpiece edges during the seam welding process.

Currently, stir welding relies on the heat of friction generated by a spinning tool located between abutting edges of two workpieces to be welded together. When weld traverse speeds are high welding heat does not build sufficiently to reach temperatures necessary for effecting a quality weld. This problem limits weld speed and the general applicability of the stir welding process. Bulk heating the workpieces does not suffice because the coefficient of friction is lowered between the stir tool and workpieces, which reduces the buildup of heat from the friction of the stirring process. It is also desirable to maintain the bulk temperature of each workpiece relatively cool to avoid reducing the properties of the base metal of the workpieces.

The principles of stir welding technology are disclosed in an article entitled "*Material Flow Behavior and Microstructure Integrity of Friction Stir Butt Weldments*" by O. T. Midling, published Sep. 1994 by the Fourth International Conference on Aluminum Alloys and in U.S. Pat. Nos. 5,460,317 and 5,469,617 to Thomas et al., the disclosures of which are incorporated herein by reference.

BRIEF SUMMARY OF THE INVENTION

The present invention solves the problem of slow travel speeds of stir welding processes (without decreasing the quality of the welds effected), by heating the metal of the workpieces immediately adjacent the rotating stir tool with electrical resistance occurring between the stir tool and workpieces. A conventional welding supply can be used to provide current flow between a stir pin of the rotatable tool and the workpiece. Electrical current can flow directly through the tool, pin and workpiece into a metal table supporting the workpiece below the location of the tool and pin, or electrical current can be applied by an electrode engaging the workpieces either ahead of or behind the stir tool, with current flowing linearly through the workpiece between the electrode and tool. The stir tool can be rotated by a rotatable chuck of a milling machine or drill press, while the power supply is appropriately connected to the chuck and to the supporting table or workpiece contacting electrode.

BRIEF DESCRIPTION OF THE DRAWINGS

The invention, along with its objectives and advantages, will be better understood by consideration of the following detailed description and the accompanying drawings in which.

PREFERRED EMBODIMENT

Figure 1:
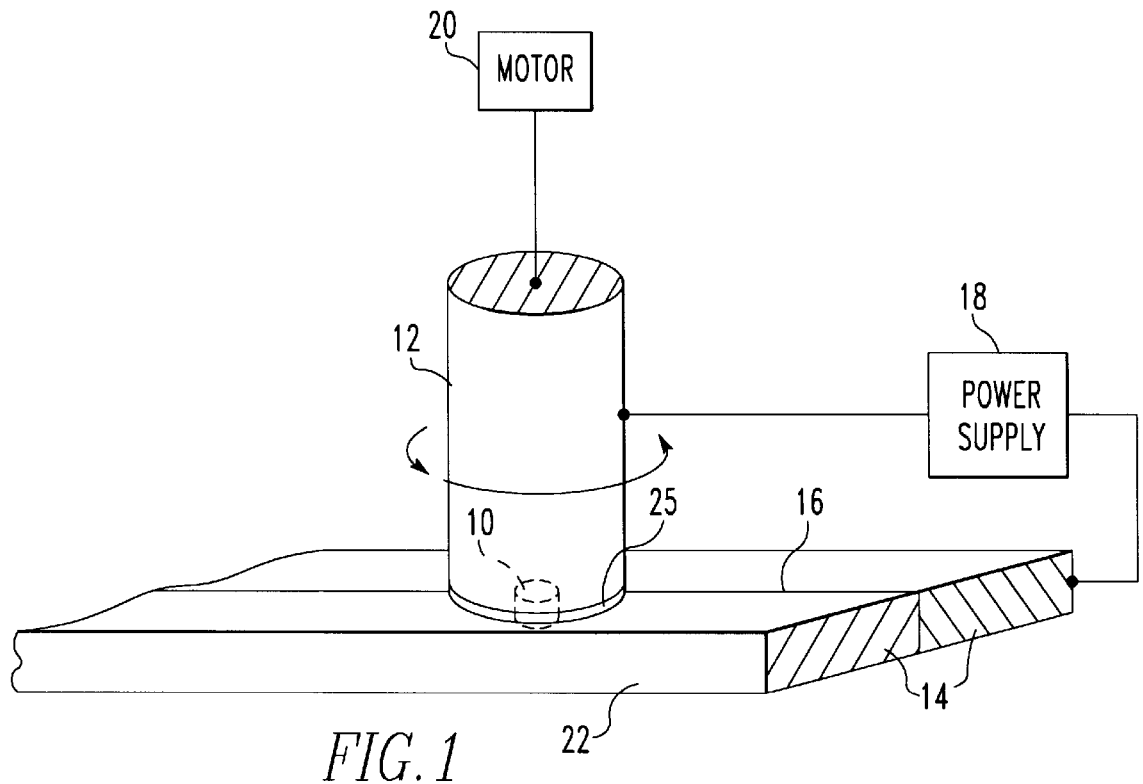
FIG. 1 is a diagrammatic representation of a rotating stir tool and a power supply connected between a table supporting workpieces for welding.

Referring now to the drawings in detail, FIG. 1 shows an embodiment of the invention in which electrical current is supplied to a stir pin 10 of a rotating tool 12 to provide heat via electrical resistance between the pin and abutting edges of two workpieces 14. The heat of electrical resistance is thus supplied directly to a stir welding process, in addition to the heat generated by the mechanical friction occurring between the tool/pin and the abutting edges of the two workpieces 14 in forming weld seam 16 between the two workpieces. In this manner, the velocity of relative linear movement between the tool and workpieces can be substantially increased over that of simply using the heat of mechanical friction in making a seam weld since the totality of the heat generated is now sufficient to accommodate the greater linear speed without adversely affecting the quality of the weld. As explained earlier, weld heat does not build rapidly enough when using only mechanical, stirring friction.

Current is supplied from a power source 18 suitably connected to tool 12 while the tool is rotated by an appropriate motor 20. The current path can be completed through an electrically conductive table 22, as the workpieces 14 travel thereagainst and relatively thereto. Current can flow in either direction or can alternate if AC power source is used. If the chuck of a milling machine (FIG. 2) or drill press is used to rotate tool 12, electrical power can be connected to the tool by the brush and copper ring arrangement depicted in FIG. 2 and described in detail hereinafter. The motor (20), of course, would be the drive motor of the milling machine or drill press.

Main objectives in effecting a weld include the quality of the weld, the integrity of the zone or area of the workpieces affected by the heat of the welding press (heat affected zone) and the integrity of the remaining portions of the workpieces. The quality of the weld itself is affected by the plasticity of the workpiece material melted by the heat of the process and the resulting flow of the material that mingles in forming the weld. The quality of the heat affected zone is controlled by dissolution and precipitation reactions taking place in the material during the thermal cycle of the welding process The properties of the remaining portions of the workpieces can be maintained by keeping bulk temperatures relatively cool. These objectives are particularly important in welding aluminum alloy workpieces.

Stir welding can particularly provide a quality seam weld since the heat generated to effect the weld is substantially confined to those portions (edges) of the workpieces actually being melted and welded. The tool end engages the workpieces under a given pressure, and the workpieces are held together under an appropriate pressure using clamping means (not shown) that secure the workpieces together and to table 22. The material of the workpiece edges is melted and readily flows about the pin, as the pin traveling linearly between the edges. The process begins by abutting the workpiece edges together and engaging one end of the abutting edges with the pin and tool end. When rotation of the tool is commenced against the one end, the resulting friction melts the abutting edges and the pin enters into the melted edges. A weld seam 16 is formed as the melted material flows together behind pin 10, as the pin travels toward the other end of the abutting workpieces. The process is completed when the pin leaves the other end of the abutting workpieces. The end of tool 12 engaging the workpieces is generally flat so that a shoulder is provided that engages the upper surfaces of the workpieces while pin 10 is located between the edges of the workpieces.

The heat affected zone of the abutting workpieces is limited essentially to the area of the workpieces located beneath rotating tool 12, which is a somewhat limited diameter, depending on the type of alloy material being welded, the speed of rotation of tool 12, the linear velocity of travel, and the amount of electrical current flowing to and through the tool and workpieces.

In this latter regard, the flow of electrical current can be further confined to pin 10 by using an electrically insulating, heat resistant layer (washer) of material 25 located on the flat working end of tool 12. This directs current flow to pin 10 and the edge material of abutting workpieces 14. This limits, in turn, the location and generation of electrically resistive heat to the pin and workpiece edges, which is where welding heat is needed and used. The bulk remainder of the workpiece material remains relatively cool.

The material of layer 25 can be ceramic or other suitable heat resistant, electrically insulating materials.

Figure 2:
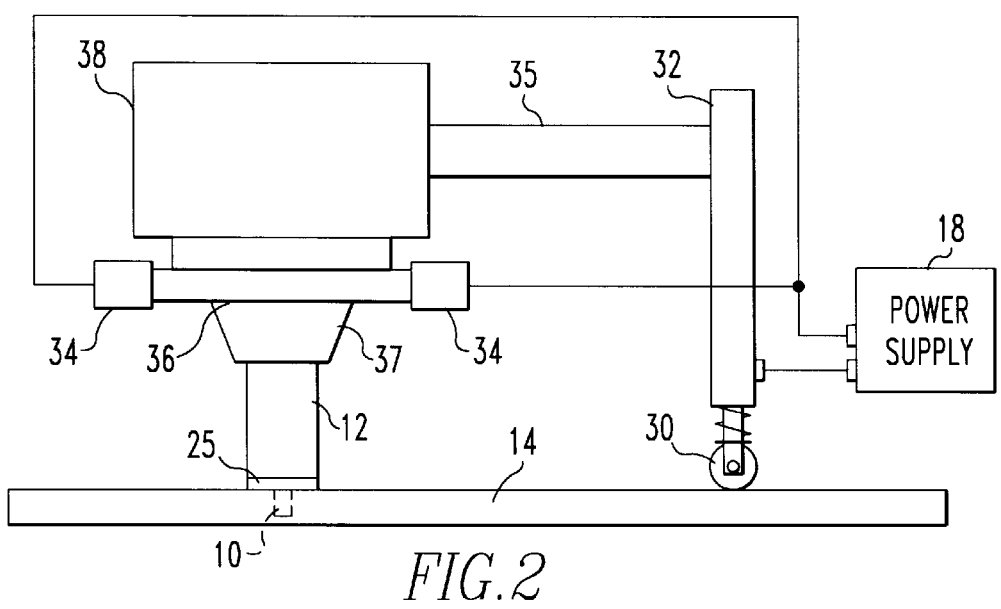
FIG. 2 is a diagrammatic representation of an alternative embodiment wherein an electrode in the form of a wheel or roller supplies current to workpieces being welded together.

In a second embodiment of the invention (FIG. 2), electrically resistive heat is supplied by an electrode 30 engaging the workpieces 14 either before of the stir tool 12 (as shown) or after the tool (not shown). In FIG. 2, the electrode is in the form of an electrically conductive pickup device that rides against the workpieces with relative linear movement of the tool and workpieces. A wheel or roller is preferred as the "pickup", as it will not scratch or mar the surface of the weld. The material of the wheel or roller can be suitable metal or other electrically conductive material.

In FIG. 2, wheel 30 is shown mounted in an electrically conductive supporting structure 32 that is connected to one terminal of a power supply 18, while the other terminal is connected to stationary brushes 34. The structure of 32 is electrically isolated from the brushes by an insulating attachment 35. Brushes 34 are located adjacent a copper ring 36 secured on a chuck 37 of a milling machine 38, all of which is diagrammatically depicted in FIG. 2. Electrical current is commutated from the brushes to copper ring 36 and chuck 37. Current can flow in either direction via ring 36 through the chuck, which is electrically conductive, to or from tool 12 and pin 10. The electrical path or circuit is completed through the abutting workpiece edges to wheel 30 and supporting structure 32.

Again, current flow is limited to the vicinity of pin 10 and the abutting edges of workpieces 14 if insulating washer 25 is used on the working end of tool 12.

What is claimed is:

1. A method of welding two workpieces together, the method comprising:

abutting the workpieces together along a respective edge of each workpiece;

locating one end of a rotatable tool astride the edges and against the workpieces, said tool having a relatively narrow pin extending from the one end of said tool disposed to engage the workpiece edges;

rotating said tool and pin to heat the workpieces edges;

relatively moving said tool and workpieces longitudinally along the workpiece edges;

directing electrical current between the workpiece edges and pin, and using electrical resistance occurring between the workpieces and pin to provide additional heat to the workpiece edges for welding the two workpieces together.

2. The method of claim 1 wherein electrical current is supplied to the workpieces via an electrically conductive wheel located in electrical contact with the workpieces at a location ahead of or behind the rotatable tool.

3. The method of claim 1 wherein the workpieces are aluminum material.

4. Apparatus for welding two workpieces together, comprising:

a tool having one end for engaging the workpieces and a pin extending therefrom to engage abutting edges of the workpieces;

means for rotating said tool and pin;

means for relatively moving the workpieces and tool along the abutting edges of the workpieces, and means for applying electrical current serially to the pin and edges of said workpieces.

5. The apparatus of claim 4 including a table for supporting the workpieces beneath the tool and for completing an electrical circuit between the pin and means for applying electrical current to the pin.

6. The apparatus of claim 4 wherein the one end of the tool for engaging the workpieces is relatively flat such that the flat end provides a rotatable shoulder above the location of the pin, and a layer of electrically insulating, heat resistant material provided on the flat end for electrically separating the end from the workpieces so that electrical current flow is concentrated in the pin.

7. The apparatus of claim 4 wherein the means for applying current to the pin and workpiece edges is a metal wheel located to engage the workpieces and to ride on the same ahead of or behind the tool.

8. The apparatus of claim 7 wherein the means for applying electrical current to the pin and workpiece edges includes a power supply electrically connected to the metal wheel and to the means for rotating the tool.

* * * * *